(12) United States Patent
Fluck et al.

(10) Patent No.: US 6,516,127 B1
(45) Date of Patent: Feb. 4, 2003

(54) MICROSTRIP LINE

(75) Inventors: Daniel Fluck, Hettlingen (CH); Tomas Pliska, Wallisellen (CH); Peter Gunter, Riedt Bei Neerach (CH)

(73) Assignee: Laboratorium fur Nichtlineare Optik, Zürich (CH)

( * ) Notice: Subject to any disclaimer, the term of this patent is extended or adjusted under 35 U.S.C. 154(b) by 0 days.

(21) Appl. No.: 09/424,600

(22) PCT Filed: Jun. 3, 1998

(86) PCT No.: PCT/CH98/00239

§ 371 (c)(1),
(2), (4) Date: Mar. 14, 2000

(87) PCT Pub. No.: WO98/55889

PCT Pub. Date: Dec. 10, 1998

(30) Foreign Application Priority Data

Jun. 4, 1997 (CH) .............................................. 1341/97

(51) Int. Cl.$^7$ .............................. G02B 6/10; G02F 1/37
(52) U.S. Cl. ...................... 385/132; 385/129; 359/328; 359/332
(58) Field of Search ................................. 385/122, 129, 385/130, 131, 141, 11; 359/326, 328, 332; 437/51, 130

(56) References Cited

U.S. PATENT DOCUMENTS

| 4,789,642 | A | | 12/1988 | Lorenzo | |
|---|---|---|---|---|---|
| 5,199,097 | A | * | 3/1993 | Shinokura et al. | 385/122 |
| 5,943,465 | A | * | 8/1999 | Kawaguchi et al. | 385/122 |
| 2001/0055453 | A1 | * | 12/2001 | Mizuuchi et al. | 385/122 |

FOREIGN PATENT DOCUMENTS

DE    195 03 931 A 1    8/1996

OTHER PUBLICATIONS

Fluck D et al: "Modeling of Refractive Index Profiles of HE+ION–Implanted KNB03 Waveguides Based on the Irradiation Parameters", Journal of Applied Physics, vol. 74, No. 10, Nov. 15, 1993.

Fluck D et al: "Blue–Light Second–Harmonic Generation In ION–Implanted KNB03 Channel Waveguides of New Design", Applied Physics Letters, vol. 69, No. 27, Dec. 30, 1996.

* cited by examiner

*Primary Examiner*—Hemang Sanghavi
(74) *Attorney, Agent, or Firm*—Oppedahl & Larson LLP

(57) ABSTRACT

The process for the manufacture of the rib waveguide (4) is based on the process steps (a) ion implantation of high-energy light ions into a crystal, (b) the application of a mask to the surface (11.1) of this crystal, which defines strips, and (c), the etching of a rib (41) onto the surface (11.1) of this crystal. The process step (a) (ion implantation) causes the formation of a layer (14) with a reduced refraction index at a depth of some micrometers below the surface of the crystal (11.1). By this refraction index barrier (14), the light in the direction vertical to the surface of the crystal is restricted. The lateral guidance of the light is effected by the lateral limits (43.1) and (43.2) of the rib (41).

The process is in particular suitable for the manufacture of waveguides in non-linear optical crystals, e.g., ferro-electric oxides (KNbO3, LiNbO3, etc.) and borates (LBO, BBO, etc.). These crystal classes have interesting non-linear-optical characteristics and are suitable for utilization as frequency converters. The manufacturing process in accordance with the invention, in particular the combination of ion implantation and the etching of a rib structure, is adapted to the particular characteristics of the material and enables the manufacture of rib waveguides with a low attenuation, whereby the non-linear optical characteristics of the crystal are maintained. This is an important prerequisite for achieving an efficient frequency conversion.

18 Claims, 7 Drawing Sheets

MICROSTRIP LINE

The invention concerns a rib waveguide, a process for manufacturing it, its utilization as well as a light source containing this rib waveguide in accordance with the generic terms of the independent claims.

BACKGROUND

Frequency conversion of laser light by non-linear optical interactions has been accorded some attention since the sixties. Non-linear optical processes enable the generation of coherent laser light at optical frequencies (wavelengths), which cannot, or else only with difficulty, be generated by a direct laser process. In general, for such a frequency conversion process a laser is utilized as pumping source, the light beam of which propagates through a non-linear optical material. The non-linear optical interaction between the laser beam and the material leads to the effect, that a part of the pumped light is converted into light of a higher or lower frequency. Among the non-linear optical processes, the second harmonic generation (SHG), sum frequency generation (SFG), difference frequency generation (DFG) and optical parametric amplification (OPA) are of particular significance. These processes enable the generation of coherent laser radiation in the ultraviolet, visible, near—and intermediate infrared spectral range, i.e., between 0.1 $\mu$m and 10 $\mu$m wavelength. Lasers which emit light at these wavelengths find applications in spectroscopy, optical data storage, medicine, biology, etc.

A further important non-linear optical process is the electro-optical modulation of laser light. Hereby an electrical field is applied to the non-linear optical crystal and with this the intensity or propagation velocity of the laser light is influenced. This effect can be utilized for transferring electronic signals to the optical beam. This makes possible the transmission of information with the help of optical systems, which today is finding widespread use in communications technology. Apart from this, the electro-optical effect is exploited for various other applications, such as in optical switches or in Q-switches in lasers for the generation of very short laser pulses.

A great number of crystalline materials which are suitable for non-linear optical interactions have been investigated. Among these, especially the class of the ferro-electric oxides has found attention, e.g., potassium niobate ($KNbO_3$), lithium niobate (LiNbO3), lithium tantalate (LiTaO3), barium titanate (BaTiO3) and KTP (KTiOPO4). In general, crystals of these materials manifest great non-linear optical susceptibilities, a material characteristic, which is a necessary prerequisite for efficient frequency conversion and electro-optical modulation. In particular potassium niobate on the basis of its outstandingly good characteristics has proved to be an excellent material for non-linear optical applications.

A further class of materials which has interesting non-linear optical characteristics are crystals based on borate compounds, such as $\beta$-BaB2O4 (BBO), LiB3O5 (LBO), CsB3O5 (CBO) and CsLiB6O10 (CLBO). This group of non-linear optical crystals is distinguished by the fact, that its optical transparency in contrast to most of the ferro-electric oxides reaches far into the ultraviolet spectral range. On the basis of this characteristic, borate crystals are interesting for frequency conversions, in which ultraviolet laser radiation is generated.

The degree of conversion in the case of a non-linear process increases with the length of interaction of pumped beam and crystal and with the intensity of the pumped beam. In order to achieve a high degree of conversion, therefore frequently additional measures have to be undertaken, in order to increase the intensity of the pumped beam, this in particular, if the laser is operated in the continuous wave (cw) mode. Investigated as such measures were above all resonant processes in optical cavities and conversion processes in optical waveguides. Resonant conversion processes, in the case of which the non-linear optical crystal is placed in a cavity, provide the possibility of achieving very high degrees of conversion. However, they have the disadvantage, that they are very sensitive with respect to the mechanical adjustment of the optical components and to small fluctuations of the pumped beam wavelength. Therefore they normally require a complicated active feedback system for stabilization. In contrast, the utilization of waveguides for frequency conversion has the advantage of, solely on the basis of the very small cross sectional surface area of the waveguide and of the lateral guiding of the laser beam, assuring a high intensity over a long interaction length and of thus achieving a high degree of conversion. For this, already a single pass of the pumped beam through the waveguide is sufficient, which substantially reduces the demands of the mechanical and frequency-related stability in comparison with optical cavities.

Waveguides also offer advantages for electro-optical applications compared with volume crystals. By the restriction of the light to a very small surface over a long distance, the electrical voltage applied for the modulation can be kept very low, whereby the required electrical power is significantly reduced. Waveguides are in addition compatible with the fibreglass technology, which is utilized in today's communications systems.

Of particular significance for applications are rib waveguides, i.e., channel-shaped waveguides, which guide the light in two directions and limit it to a very small surface.

The above explanations emphasize the significance of waveguides, in particular of rib waveguides, for non-linear optical applications. The manufacturing processes of such waveguides, however, are frequently technologically difficult and have to be adapted to the corresponding material characteristics. This invention is based on a process, which permits the manufacture of waveguides of good optical quality in non-linear optical crystals, while maintaining the advantageous characteristics of these materials.

For the manufacture of optical waveguides in non-linear optical crystals, different methods have been investigated, both chemical—as well as physical ones. By means of ion diffusion—or ion exchange processes in the non-linear optical crystal, one, for example, succeeded in manufacturing waveguides in LiNbO3, LiTaO3 and KTP. Proving to be successful, e.g., was the diffusion or implantation of titanium (Ti) in LiNbO3. Within the Ti-doped zone, the refraction index is increased, while simultaneously the desired optical characteristics of the LiNbO3 are maintained. Almost all other non-linear optical crystals, however, are not accessible for this process, because the outside ion diffusion constants and the thermal stability are insufficient. Also the forced doping with the help of ion implantation does not achieve the objective, because the ion implantation of heavy ions such as Ti damages the host lattice structure through atom impacts and creates defects, so that no usable waveguides are produced. Among the physical methods, above all the implantation of light ions such as H+ or He+ have found applications. With these processes, the crystalline material is subjected to a bombardment of high-energy ions. This leads to the formation of a buried optical barrier, i.e., to a zone with a lowered refraction index, and to a wave-guiding layer underneath the surface of the crystal.

Fluck and others, in the publication "Low-loss optical channel waveguides in KNbO3 by multiple energy ion implantation" (J. Appl. Phys. 72 (5), 1671 (1992)) have demonstrated, that the manufacture of rib waveguides by ion implantation, e.g., into ferro-electric oxides such as KNbO3, is possible with a process, which uses several implantation steps. The rib waveguides manufactured in this manner, however, have the disadvantage, that they only conduct light of one polarization direction, while light with a polarization vertical to that does not propagate in the waveguide. In order, however, to make a frequency conversion in KNbO3 possible, the waveguide must necessarily also conduct light of both vertical as well as horizontal polarization. In the publication "Blue-light second-harmonic generation in ion-implanted channel waveguides of new design" (Appl. Phys. Lett. 69 (27), 4133 (1996)), Fluck and others have described a simpler process, which enables the manufacture of rib waveguides with only one implantation step. This process is the subject of the German patent application "Wellen-oder Streifenleiter, sowie Verfahren zu seiner Herstellung". Rib waveguides, which are manufactured with this process, have significantly improved optical characteristics in comparison with rib waveguides, which are manufactured using several implantation steps. On the basis of the narrow optical barrier on the side walls, however, they have a comparatively high attenuation.

In the patent document "Method for the fabrication of low loss crystalline silicon waveguides by dielectric implantation" (U.S. Pat. No. 4,789,642) of Lorenzo and others, a process is described, which enables the manufacture of rib waveguides by means of ion implantation and etching. In doing so, a silicon substrate is exposed to the bombardment of high-energy oxygen—or nitrogen ions. These ions at a certain depth below the surface of the silicon substrate form a crystalline dielectric layer of silicon oxide (SiO2) or silicon nitride (Si3O4), which in comparison with the silicon layer above it manifests a significantly decreased refraction index. By etching or epitaxial growing of additional silicon in suitable places, subsequently ribs can be formed on the substrate surface and with this, rib waveguides. This process, however, is based on the particular material characteristics of silicon, where the implantation of heavy ions, such as oxygen or nitrogen effects the formation of a crystalline oxide—or nitride layer and with this a chemical change in the material. In contrast to this, the implantation of light ions, such as protons or helium into a ferro-electric oxide, e.g., KNbO3, or a borate, e.g., LBO, leads to the formation of a partially or completely amorphous damage zone due to atom impacts, not, however, to a chemical change of the material. This is also applicable for the implantation of heavy ions. The process of Lorenzo and others is therefore not transferrable to ferro-electric oxides or borates. In addition, this patent document refers exclusively to waveguides made of silicon for applications in the communication technology at light wavelengths of between 1.3 and 1.6 µm. Because of the characteristics of silicon, these waveguides, however, cannot be utilized for frequency conversion processes.

It is the object of the invention to create a rib waveguide of good optical quality in a crystal, in particular a ferro-electric oxide or a borate. Furthermore, it is the object of the invention, to indicate a process, which enables the manufacture of such waveguides. Furthermore, it is the objective of the invention, to demonstrate the utilization of these rib waveguides for the efficient frequency conversion of semiconductor diode lasers and of solid-state lasers. In addition, it is the objective of the invention to create a light source, in which the light emitted by at least one primary light source is efficiently frequency converted.

SUMMARY OF THE INVENTION

The objective is achieved by the rib waveguide, the manufacturing process and the light source, as they are defined in the independent claims.

The rib waveguide in accordance with the invention is manufactured out of a crystal. It manifests a barrier layer in the crystal, the refraction index of which is lower than the refraction index of the crystal, and which limits the rib waveguide in the direction vertical to a certain surface of the crystal. In addition, it has a rib on the surface mentioned, the walls of which limit the rib waveguide in the direction parallel to the mentioned surface.

The process in accordance with the invention to a great extent circumvents the above mentioned difficulties in the manufacture of rib waveguides in non-linear optical crystals, such as, e.g., KNbO3. In essence, it consists of three process steps: (a) the implantation of high-energy light ions into a non-linear optical crystal, (b) the photo-lithographic production of a mask on the surface of this crystal or the utilization of a suitably pre-structured mask, e.g., made of silicon, and (c) the etching of the crystal from the surface, in order to form a rib screened by the utilization of the mask on this surface, whereby the lateral guidance of the light in the rib waveguide is assured.

The method of ion implantation exploits the permanent radiation damage, which is caused in the base material by the bombardment with ions. In the case of the utilization of light ions, e.g., H+, He+ or HE++, the radiation damage caused is concentrated at the end of the ion path. The zone close to the surface is in comparison only slightly damaged. The crystal volume in the depth as a result of the damage manifests a lower refraction index. In this way it is possible to guide light between the surface of the crystal and the damaged volume in the depth. Ion implantation provides the advantage of being able to manufacture tailor-made waveguides for very specific applications, thanks to the precisely controllable process parameters (ion dosage and—energy). The thickness of the wave-guiding layer (position of the optical barrier in the material) can be defined through the ion energy, while the refraction index in the optical barrier is defined by the ion dosage.

An important prerequisite for the usability of waveguides for non-linear optical processes consists in the fact, that the non-linear optical characteristics of the material are maintained during the manufacture of the waveguides. Precisely ion diffusion—or ion exchange processes can strongly reduce the non-linearity or destroy it completely. Here too, the ion implantation provides an advantage, because the damage to the material in the layer close to the surface, i.e., in the wave guiding zone, is comparatively minor and following the ion bombardment, it can be partially or even completely reversed.

The utilization of a photo-lithography process for the production of a mask for the subsequent manufacture of a rib waveguide, provides the benefit of being able to structure very precise patterns on the surface of the crystal. The photographic lacquer mask can thereupon be hardened using special chemical or physical processes, in order to make it more resistant to the subsequent etching process.

The utilization of a pre-structured mask has the advantage, that the mask structure, in particular the mask thickness, can be adapted to the subsequent etching process independent of the characteristics of the photographic lacquer. On offer as mask material is in preference silicon, also, however, wires or foils made of metal or glass can be used as mask.

The etching of the crystal from the surface and the rib on the surface of the crystal created in this manner leads to the manufacture of a rib waveguide, which manifests important advantages in comparison with the current processes. In particular, with this method the lateral guidance of the light is not achieved by an implantation process as in the case of the mentioned processes, which utilize multiple implantations or single implantation with inclined side walls. As a result, effects, which have an unfavourable influence on the waveguide, such as, e.g., tensions in the material, can be avoided. The etching process in addition can be adapted to the special characteristics of the material, whereby both wet—as well as dry etching processes can be utilized.

The rib waveguide in accordance with the invention can be used in optical frequency converters, electro-optical modulators and switches. In particular, the rib waveguide in accordance with the invention is utilized in combination with a diode laser or a solid-state laser for optical frequency multiplication, the generation of sum or difference frequencies and opto-parametric amplification or oscillation.

The rib waveguide in accordance with the invention is suitable for applications in optical frequency converters, electro-optical modulators as well as switches. For example, through the combination of a rib waveguide manufactured in $KNbO_3$ and an AlGaAs or InGaAs diode laser, by optical frequency doubling light in the spectral range between 430 and 550 nm can be generated. As further possible pumped light sources, apart from semiconductor diode lasers also solid-state lasers are possible, above all Nd and Cr doped garnet, such as, e.g., YAG ($Y_3Al_5O_{12}$), GGG ($Gd_3Ga_5O_{12}$), YSAG ($Y_3Sc_2Al_3O_{12}$), Gsag ($Gd_3Sc_2Al_3O_{12}$), GSGG ($Gd_3Sc_2Ga_3O_{12}$) as well as $mYVO_4$, LiSAF and $Ti:Al_2O_3$. As a further example, through the combination of a diode laser, e.g., AlGaInP and a waveguide in a borate crystal, ultraviolet laser radiation in the wavelength range between 180 and 430 nm can be generated by frequency doubling. As further possible pumped light sources, apart from diode lasers also frequency-doubled solid-state lasers are possible. Borate crystals are suitable for non-linear optical processes of a higher order, e.g., the generation of third—or fourth harmonics, which, e.g., can be pumped with the mentioned solid-state lasers. Apart from this, with two light beams, which originate from two different laser sources, in a waveguide the generation of sum—or difference frequency can be achieved. As a further application, the waveguide can be utilized for the opto-parametric oscillation. These processes enable the generation of ultraviolet, visible or infrared light tuned to the wavelength, by pumping with a suitable laser. The rib waveguide is thereupon suitable for applications in communication technology, such as in electro-optical modulators, switches or directional couplers, whereby the waveguide is combined with suitable electrode structures. These components, for example, enable the optical coding of information onto a light beam or the switching of light between different glass fiber waveguides.

The light source in accordance with the invention contains at least one primary light source and at least one frequency converter, into which light emitted from the primary light source is coupled, whereby at least one frequency converter is the rib waveguide in accordance with the invention. Preferably suitable as primary light sources are semiconductor diode lasers (e.g., AlGaAs or InGaAs diode lasers), solid-state lasers (e.g., Nd:YAG, $Nd:YO_4$ or Cr:LiSAF), wave guide lasers or fibre lasers. The light sources, which are based on the optical frequency multiplication (e.g., frequency doubling), opto-parametric amplification or opto-parametric oscillation, in preference contain a primary light source and a frequency converter. Light sources, which are based on optical sum—or difference frequency generation, in preference contain two primary light sources and a frequency converter.

The light emitted by the primary light source is preferably input to the rib waveguide directly or through an optical system. In order to keep the coupling losses at the first and second front side of the rib waveguide as low as possible, in preference both front sides of the rib waveguide should be provided with an anti-reflex coating. The residual light from the primary light source is uncoupled together with the light generated in the rib waveguide by the frequency conversion, e.g., light with the double frequency, through the second front side of the rib waveguide and in preference by means of an optical system, e.g., one or several lenses, bundled into a laser beam with a small divergence. The second front side of the rib waveguide can also be provided with a reflecting coating, so that the light coupled into the rib waveguide together with the light generated by the frequency conversion passes through the rib waveguide once again in the other direction and is then uncoupled through the first front side of the rib waveguide.

In the preferred embodiment, the crystal, (e.g., $KNbO_3$) is bombarded with high-energy light ions (e.g., He+ ions with 2 MeV energy), in order to form a damaged zone buried underneath the surface with a lower refraction index. Subsequently, a mask made out of photographic lacquer is produced with the help of a photo-lithographic process, which covers narrow, strip-shaped zones. Finally the crystal is etched from above, whereby the zone covered by the mask remains unchanged. As a result, a rib is formed in this zone, which stands out from the surface of the crystal. Utilized for the etching is in particular a physical etching process (sputtering), for example, plasma etching with Ar+ ions.

In a second embodiment, following the process step (a) (implantation of a planar waveguide) the crystal is baked for a certain time period, in order to cure defects in the crystal lattice structure, which occur during the implantation. This curing process can also be carried out after the process step (c) (etching of a rib).

In a third embodiment, providing the non-linear optical crystal is ferro-electric, following the process step (a) (implantation of a planar waveguide) an external electric field is applied along the spontaneous polarization of the crystal, in order to reorientate ferro-electric domains created during the implantation and to pole the crystal completely along a designated direction.

In a fourth embodiment, following the process step (b) (photo-lithographic production of a mask) a process is utilized, which hardens the photo-lithographic mask and therefore makes it more resistant against the subsequent etching process. This process can consist of an additional implantation step with ions of low energy. As further possible measures for hardening the mask, chemical processes, baking or irradiation with ultraviolet light can be applied.

In a fifth embodiment, following the process step (c) (etching of a rib) a layer of low refraction material is applied to the surface of the crystal. This layer can in particular consist of oxidic compounds, such as $SiO_2$, $Al_2O_3$, $Ta_2O_5$ or $Nb_2O_5$. This layer on the one hand serves to protect the rib waveguide from mechanical damage, on the other hand it has the purpose of reducing the optical diffusion losses at the interface waveguide-air.

In a sixth embodiment, the rib waveguide is split-up into two or more zones in such a manner, that light can be guided separately in each one of these zones. This is achieved by the implantation or further index barriers, whereby this takes place following the process step (a) (implantation of a planar waveguide) or (c) (etching of a rib).

In a seventh embodiment, following the process step (a) (implantation of a planar waveguide) a pre-structured mask is utilized instead of the mask made of photographic lacquer. This pre-structured mask in preference consists of silicon, however, wires, fibres or foils made of metal or glass can also be utilized.

DESCRIPTION OF THE DRAWINGS

The invention and as a comparison the state of the art are explained in detail on the basis of the FIGS. 1 to 14. These show.

For reasons of clarity, the proportions in the Figures do not correspond to those in reality.

DETAILED DESCRIPTION

Figure 1:
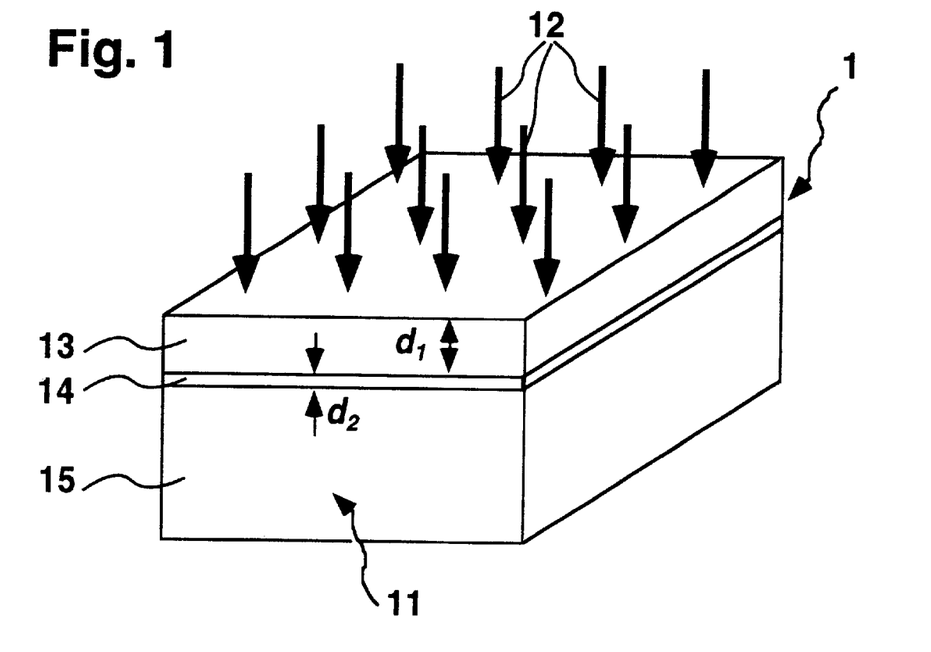
FIG. 1 the manufacture of a planar waveguide in a crystal by means of ion implantation in accordance with the state of the art, FIG. 2 a mask for the subsequent etching of a rib waveguide, FIG. 3 the etching of a rib on a crystal, FIG. 4 a rib waveguide created by ion implantation and the etching of a rib on a crystal, whereby the index barrier lies below the rib, FIG. 5 a rib waveguide, in the case of which the index barrier is within the rib, FIG. 6 the process for re-poling a ferro-electric crystal, in order to make it single domain, FIG. 7 the process for hardening the photographic lacquer mask for the subsequent etching process by means of ion implantation, FIG. 8 a rib waveguide with a covering layer applied on top, FIG. 9 a crystal with several rib waveguides, FIG. 10 a rib waveguide, which is split-up into several zones, which separately guide light, FIG. 11 a light source, which utilizes a semi-conductor diode laser together with the rib waveguide in accordance with the invention as an efficient frequency converter, FIG. 12 a compact light source, which utilizes a semi-conductor diode laser together with the rib waveguide in accordance with the invention as an efficient frequency converter, FIG. 13 a light source, which utilizes a solid-state laser together with the rib waveguide in accordance with the invention for an efficient frequency conversion, FIG. 14 a light source, which utilizes the rib waveguide in accordance with the invention together with a waveguide laser for efficient frequency conversion.

The state of the art for the manufacture of a planar waveguide by means of ion implantation is illustrated in FIG. 1. A non-linear optical crystal 11 (e.g., KNbO3) is exposed to an ion beam 12 of high-energy light ions. Considered as such ions are, e.g., protons (H+) or helium ions (He+ or He++) with energies in the range of some tenths of—to some Mega-electron Volts (MeV), e.g., 0.3 to 3 MeV. The ions penetrate into the crystal and due to the interaction with the electrons and atoms of the crystal lose their energy. In a zone close to the surface 13, the crystal is damaged comparatively slightly. At the end of the ion path, a zone 14 is formed, within which the crystallinity of the material is damaged or destroyed. Because of this damage, the zone 14 has a lower refraction index than the undamaged crystal 11. With this, in the damage zone a refraction index barrier 14 versus the zone close to the surface 13 above it and the undamaged crystal volume below it is formed. The refraction index barrier 14 makes it possible to guide light in the zone close to the surface 13 above it. The typical thickness d1 of this zone 13 amounts to some micrometers ($\mu$m), e.g., 4.4 $\mu$m for 2 MeV He+ ions in KNbO3, while the thickness d2 of the damaged zone 14 (refraction index barrier) amounts to some tenths of $\mu$m. The complete structure, consisting of zone 13 close to the surface, refraction index barrier 14 and the undamaged crystal volume 15 serving as substrate, form a planar waveguide 1. In order to increase the thickness d2 of the barrier layer 14, it is also possible to carry out several implantation steps with ions of slightly differing energy. For example, in KNbO3, two subsequent implantation steps with ions with an energy of 2 and of 1.85 MeV lead to the formation of a 0.8 $\mu$m wide damaged zone. By the manufacture of a wide refraction index barrier 14, the optical losses of the waveguide resulting from the radiation of light out of the waveguide into the substrate can be prevented. The crystal 11, which is utilized for the manufacture of the waveguide, in preference has surfaces polished to optical quality. Apart from this, however, the process can also be utilized on crystals with naturally grown surfaces. The edges of the crystal relative to the crystallographic axes can have any direction.

Figure 2:
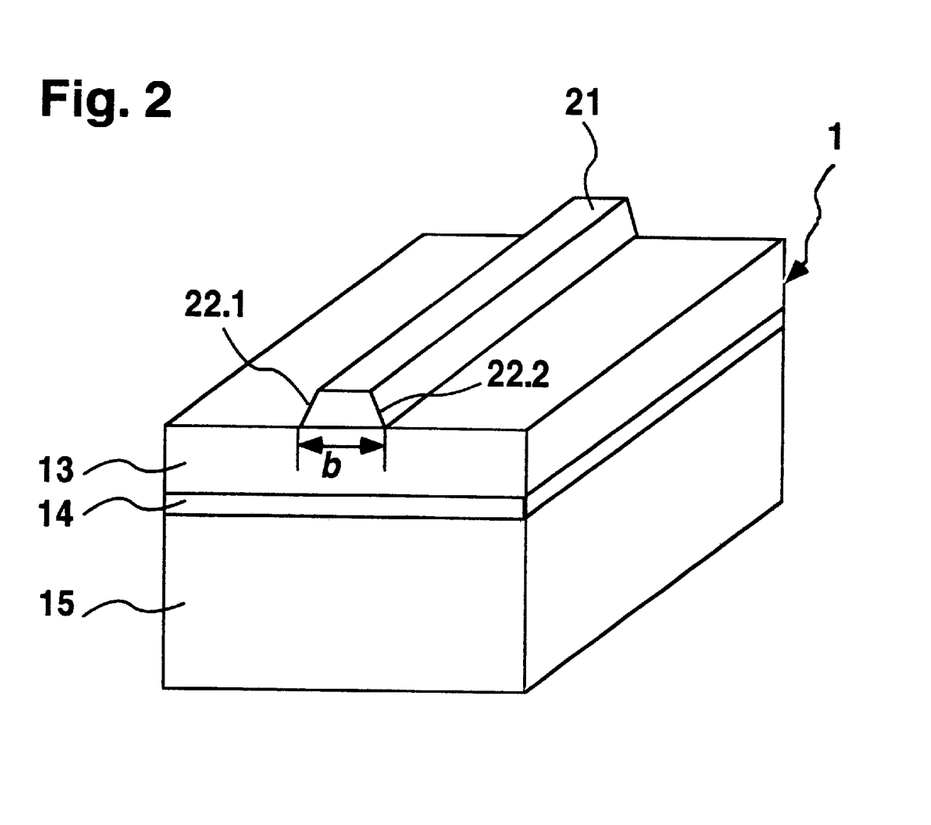
Figure 3:
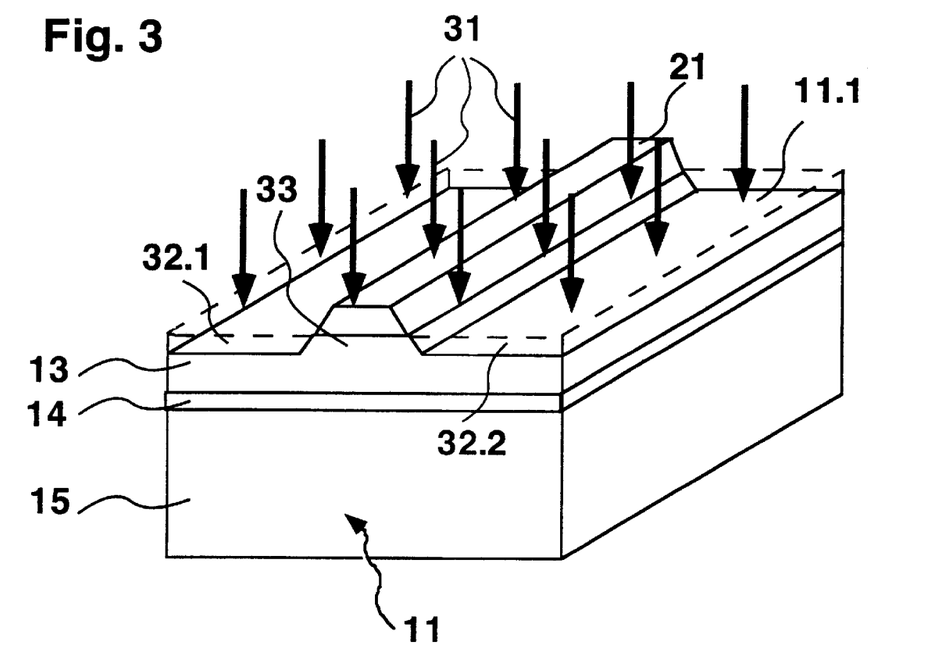
Figure 4:
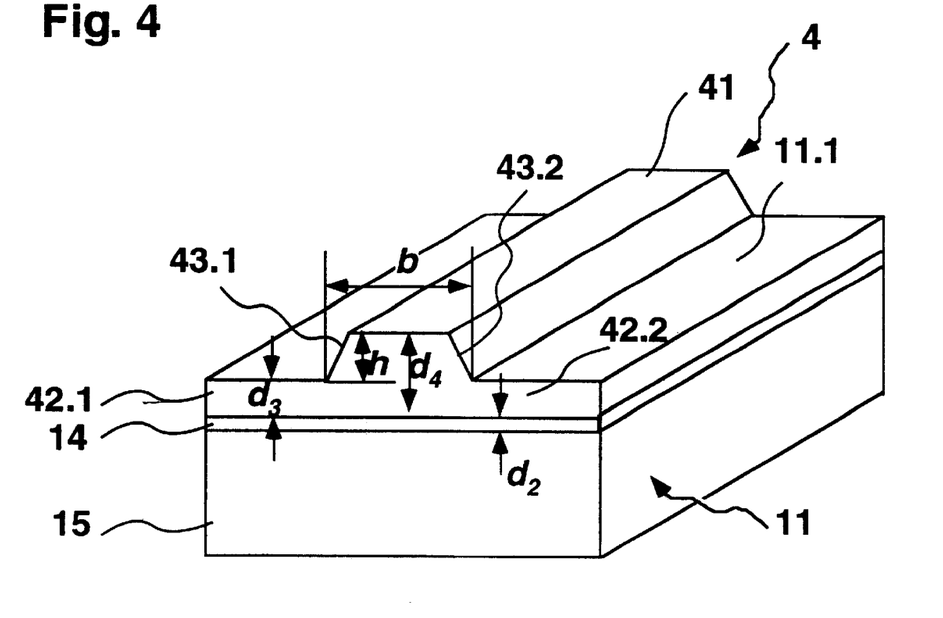
Figure 5:
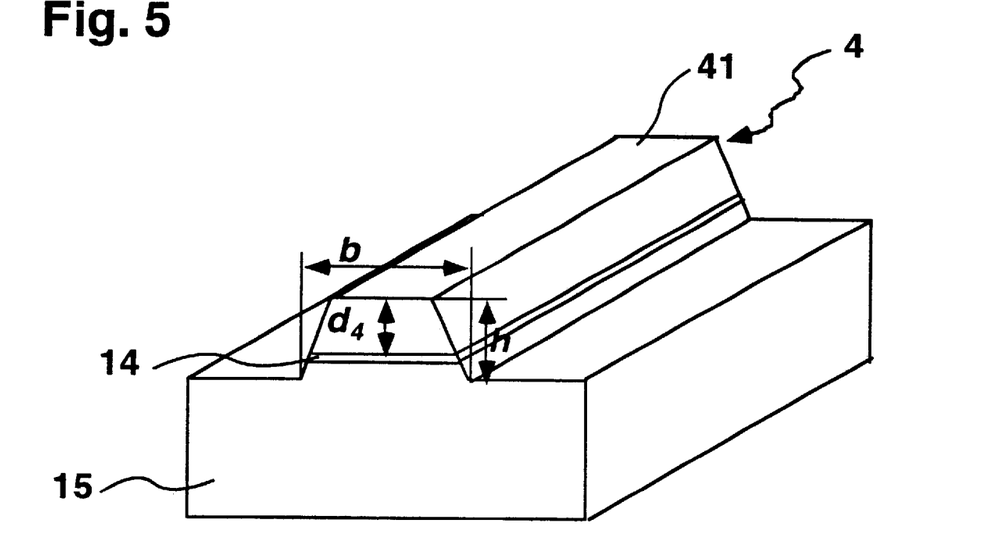

The process in accordance with the invention is described in the FIGS. 2 to 10. After the manufacture of a planar waveguide 1 in a non-linear optical crystal 11 by means of ion implantation (FIG. 1), a strip-shaped mask 21 made of photographic lacquer or of another suitable material is applied to the surface of this planar waveguide, as is illustrated in FIG. 2. The width b of the strip amounts to some micrometers (e.g., 5 $\mu$m). The steepness of the flanks 22.1 and 22.2 of the strip-shaped mask 21 can be changed through the exposure—and development time of the photographic lacquer during the photographic process, whereby in preference an a great as possible steepness is strived for, i.e., a rib with vertical flanks. It is also possible to utilize a prestructured mask. This provides the benefit, that the mask structure, in particular the mask thickness and the flank shape, can be adapted independent of the processing characteristics of the photographic lacquer. On offer as mask material is in preference silicon, but also wires or foils made of metal or glass can be utilized as mask. FIG. 3 illustrates the next process step. By means of a dry etching process, the zone 1 close to the surface is etched down with ions 31 in the two not covered zones 32.1 and 32.2. For KNbO3, for example, for this in preference Ar+ ions from a plasma are utilized, whereby the material is mechanically sputtered off. The energy of these ions preferably lies in the range of 0.1 to 20 kilo electron Volts (keV). As a further possibility, ions of chlorine fluoride hydrocarbon compounds (e.g., CH3F, CCl2F2, CF4) can be made use of as chemical dry etching agents. The etching process can also be carried out as a wet etching process, e.g., by etching with hydrofluoric acid (HF). By the etching, the uncovered zones 32.1 and 32.2 are lowered relative to a covered zone 33, and a rib is formed on a defined area 11.1 of the crystal 11. A rib 41 like this is depicted in FIG. 4. The whole structure consisting of the rib 41, two zones 42.1 and 42.2 laterally adjacent to the rib, the refraction index barrier 14 as well as the crystal volume 15 serving as substrate form the rib waveguide 4. In this, d3 designates the distance between the crystal surface 11.1 and the index barrier in the lateral zones 42.1 and 42.2 and d4 the distance between the surface of the crystal and the index barrier 14 in the rib 41. The rib waveguide 4 guides light in two directions, whereby the guidance vertical to the crystal surface 11.1 is enabled by the refraction index barrier 14 and the guidance in the direction parallel to the crystal surface 11.1 by the lateral limits 43.1 and 43.2 of the rib 41. The height h of the rib 41, defined as the distance between the surface of the rib 41 and the surface 11.1 of the crystal above the lateral zones of the rib 42.1 and 42.2, is determined by the duration of the etching. In order to assure the lateral guiding in the rib waveguide 4, already a small height h (etching depth) in comparison to the distance d4 of the rib surface to the index barrier 14 is sufficient. For example, for a thickness d4 of 5 μm, a rib height of approximately 0.5 μm is sufficient for achieving the lateral guidance of the light in the rib waveguide 4. To be strived for is an etching depth h of between 25% and 75% of the thickness d4, in order to achieve an optimum lateral guidance. The duration of the etching, however, can also be selected in such a manner, that the height h of the rib 41 is equal to or greater than the distance d4 of the rib surface from the refraction index barrier 14. FIG. 5 shows a rib waveguide 4, where h is greater than d4.

The bombardment of a crystal 11 with light ions 12 (FIG. 1) can lead to defects in the crystal lattice structure in the irradiated zone 13 close to the surface. These defects concern, e.g., the displacement of individual ions from their positions in the lattice structure or the formation of oxygen vacancies in the lattice structure. These defects can absorb or scatter light and therefore cause undesired optical losses of the light guided in the rib waveguide. In many non-linear optical crystals, such defects can be cured by a heat treatment (tempering) of the crystal following the ion implantation. In KNbO3, for example, such a tempering treatment at 180° C. for a period of ten hours leads to a reduction of the optical losses of the waveguide by up to 10 dBcm−1. Such a tempering step can also only be carried out after the formation of the rib waveguide 4 (FIG. 4). The tempering step can be carried out in a normal atmosphere. For the curing of oxygen vacancies, it can, however, also be advantageous to carry out the tempering treatment in an atmosphere with an excess of oxygen.

Figure 6:
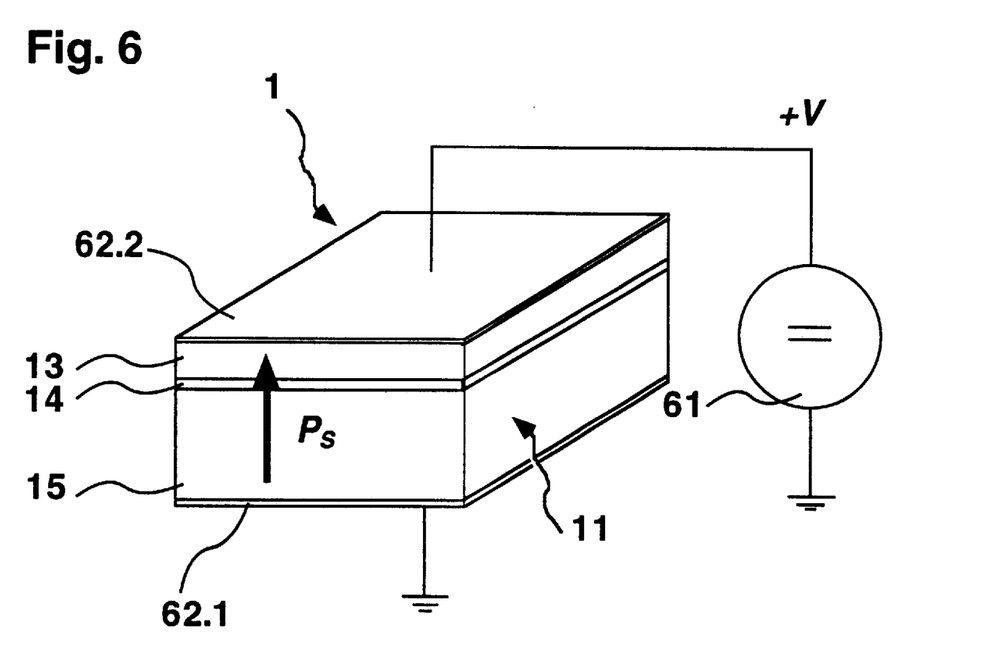

In the particular case of ferro-electric crystals, the centers of gravity of the positively and negatively charged ions do not coincide, as a result of which the material obtains a spontaneous polarization Ps, which characterizes a preferred direction in the crystal. In an ideal ferro-electric crystal, the spontaneous polarization has the same direction in the whole crystal. Such a crystal is designated as single domain. If in a ferro-electric crystal several zones occur, in which the spontaneous polarization has different directions, then the crystal is designated as multi-domain or depolarized. The bombardment of a ferro-electric crystal 11 with light ions 12 leads to the formation of ferro-electric domains in the irradiated zone 13, i.e., to zones, which have a differing direction of polarization. Such a depolarization can lead to the partial loss of the optical non-linearity in the zone close to the surface 13. FIG. 6 illustrates a possible arrangement, by means of which through the application of a sufficiently high external electric field to the crystal (e.g., 3 kVcm−1 in the case of KNbO3), the polarization in these domains can be fully aligned in parallel again. Such a post-poling process is in preference carried out after the implantation of the planar waveguide 1. Indicated is the preferred direction of the spontaneous polarization Ps of the original crystal 11 used for the manufacture of the waveguide. With the help of a high voltage source 61, which is only schematically depicted, and of an electrode 62.1 and 62.2 each respectively applied to the top and bottom side of the crystal 11, a DC voltage V is applied to the crystal 11 and an electric field with its direction parallel to Ps is created. Under the influence of this field, the spontaneous polarization in domains in the zone close to the surface 13, which have been created as a result of the implantation 12 and the polarization vector of which is not anymore parallel to Ps, is re-aligned along the direction of Ps. Since the direction of Ps does not necessarily have to run vertical to the crystal surface, also other arrangements than the one illustrated in FIG. 6 are possible. For example, Ps can also run parallel to the crystal surface, so that the electrodes 62.1 and 62.2 correspondingly are applied to the lateral surfaces of the crystal 11. The electrodes 62.1 and 62.2 can consist of metallic plates, which are brought into contact with the crystal 11. Electrodes can equally be produced by the application of a metallic layer (e.g., by vaporization or painting on). Furthermore, electrolytic liquid electrodes can be utilized. Possible is also a combination of different types of electrodes, for example, a metallic plate underneath and a vaporized metal layer on top. The voltage V can be applied both in static form as well as pulsed.

Figure 7:
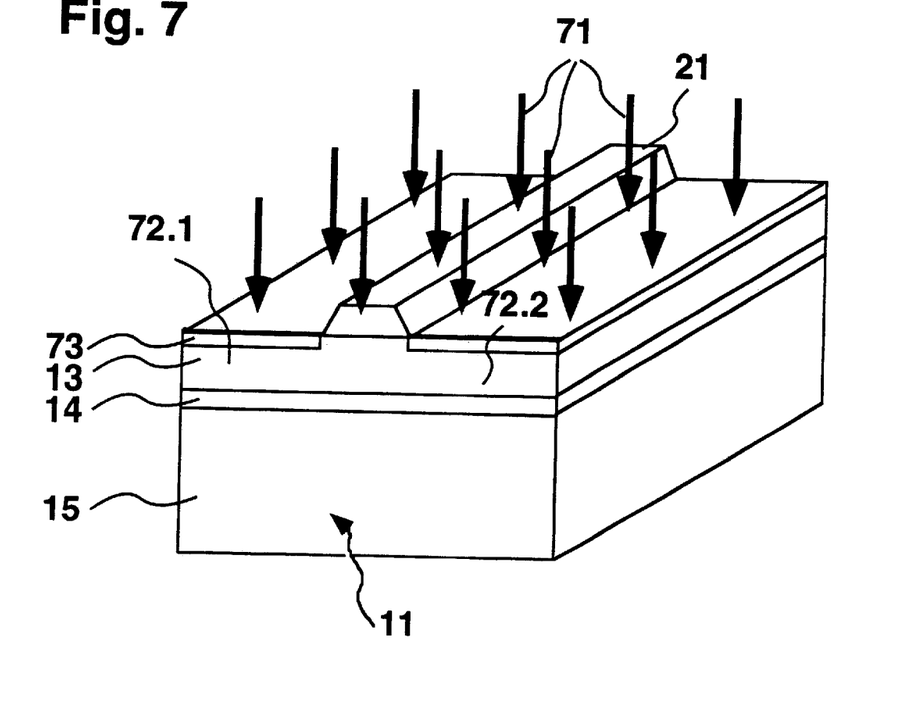

A further manufacturing step can be inserted after the formation of the strip-shaped photographic lacquer mask 21 (FIG. 2). By means of a further bombardment with light ions of low energy 71 (between 0.1 and 0.5 MeV for helium, between 0.05 and 0,2 MeV for protons), it can be achieved, that the ions are already completely moderated in the mask 21, as is shown in FIG. 7. This leads to a structural change of the photographic lacquer, which results in a hardening against mechanical or chemical processing. In two not covered zones 72.1 and 72.2, the ions because of their low energy only penetrate into a surface 73 immediately below the surface of the crystal 11. A hardening of the photographic lacquer has the consequence, that the etching rate ratio of the photographic lacquer relative to the crystal can be improved. This is of great importance, because the etching rates of the crystal 11 can be very small and one therefore has to prevent the photographic lacquer mask 21 being eroded too rapidly relative to the crystal during the etching process. To be considered are also other hardening measures, such as baking the photographic lacquer at an increased temperature, irradiation with UV light or chemical processes, such as, e.g. the treatment of the photographic lacquer with chlorobenzene.

Figure 8:
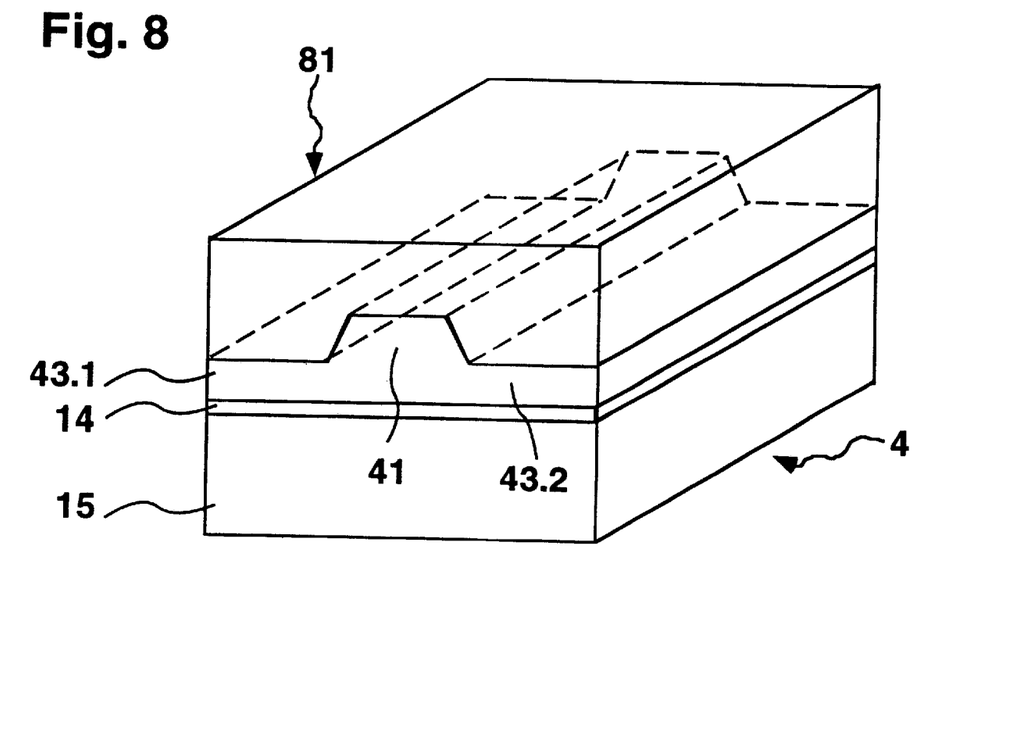

FIG. 8 demonstrates how after the etching process a covering layer 81 is applied onto the rib waveguide and the laterally adjoining zones 43.1 and 43.2. This consists of a dielectric material, which has a lower refraction index than the zones 41, 43.2 and 43.2. For this, in particular oxides such as SiO2, Al2O3, Ta2O5 or NbO5 come into consideration. The covering layer 81 can be applied with a conventional process, such as, for example, vaporization or sputtering under vacuum. Its task on the one hand consists in the protection of the rib 41 from mechanical damage. On the other hand, by the reduction of the refraction index jump at the interface surfaces between rib waveguide 4 and the ambient, the optical diffusion losses of the waveguide are reduced.

Figure 9:
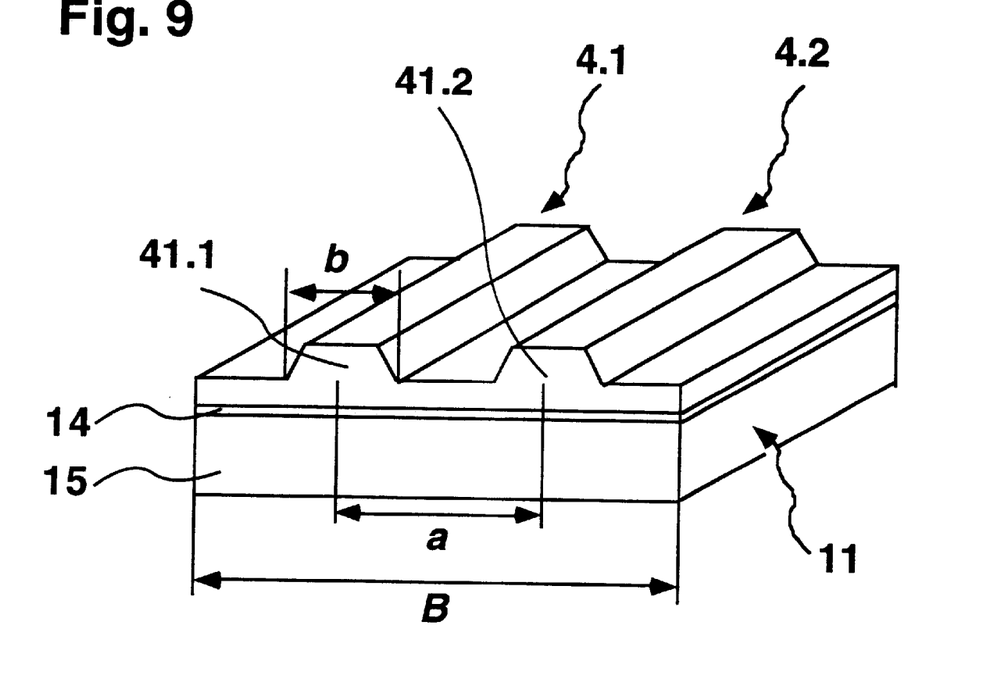

FIG. 9 illustrates, how in a crystal 11 several, e.g., two, rib waveguides 4.1 and 4.2 can be produced by the etching of several ribs. Such arrangements can, for example, find application in directional couplers, optical switches or integrated optical interferometers. In it, the distance a of the rib waveguides amounts to at least half the rib width b and at most the whole width of the crystal B. The process steps (a) (implantation), (b) (photo-lithographic mask production) and (c) (etching) in preference take place simultaneously for all waveguides, whereby in the case of the process step (b), a mask with a suitable strip pattern is utilized. The number of waveguides on a crystal can also be significantly greater than in the example illustrated, e.g., also 100.

Figure 10:
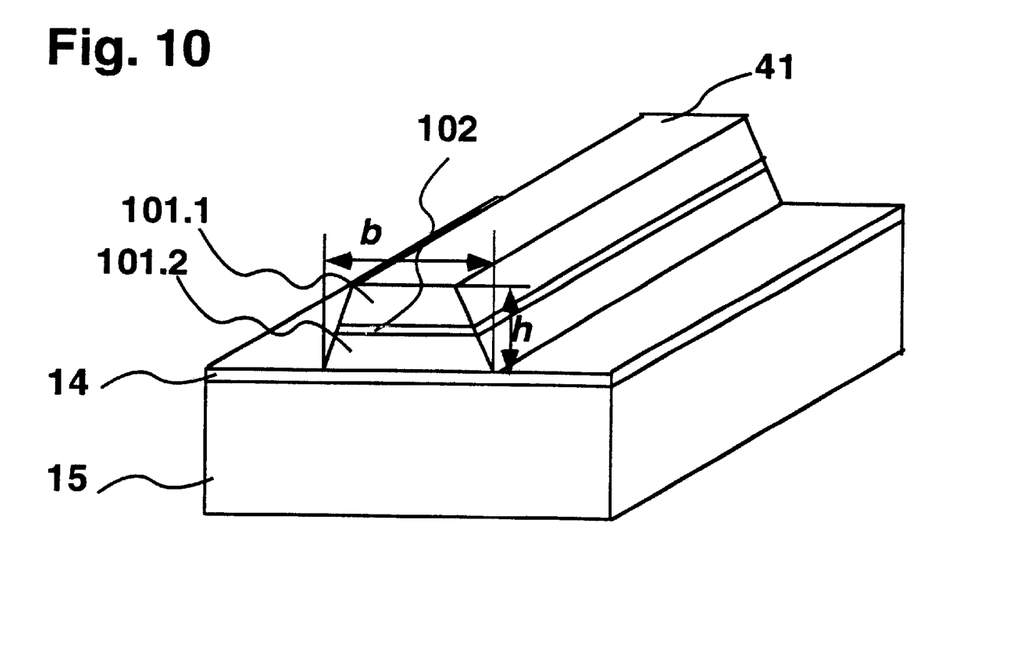

For applications in optical switches it can be necessary to produce structures with several waveguides lying one above the other, in order to switch light from one channel to another. FIG. 10 shows such an arrangement of two superimposed, separately guiding zones 101.1 and 101.2 within one rib 41. The two zones 101.1 and 101.2 are separated by an index barrier 102, which was also produced through ion implantation. This additional implantation step can take place after the manufacture of the originally planar waveguide 1 (FIG. 1). In doing so, for the second implantation step ions with low energy are utilized, e.g., with half the energy, which was utilized for the prosduction of the planar waveguide 1. Subsequently, the etching process as described above is carried out. Equally, however, the second implantation can also only take place following the etching of a rib (FIG. 4). Furthermore, it is possible to produce several, e.g., eight, separately light-guiding zones 101 with more than two successive implantation steps.

The rib waveguide in accordance with the invention is in preference utilized in combination with a semiconductor diode laser or a solid-state laser for optical frequency multiplication, sum— or difference frequency generation and opto-parametric amplification or oscillation. Preferred embodiments of light sources, which contain the waveguide in accordance with the invention, are described in the FIGS. 11 to 14.

Figure 11:
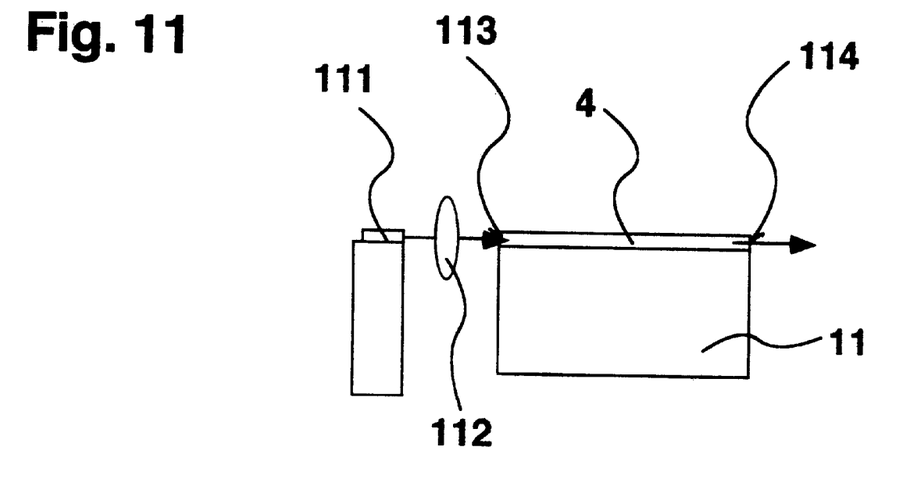
Figure 12:
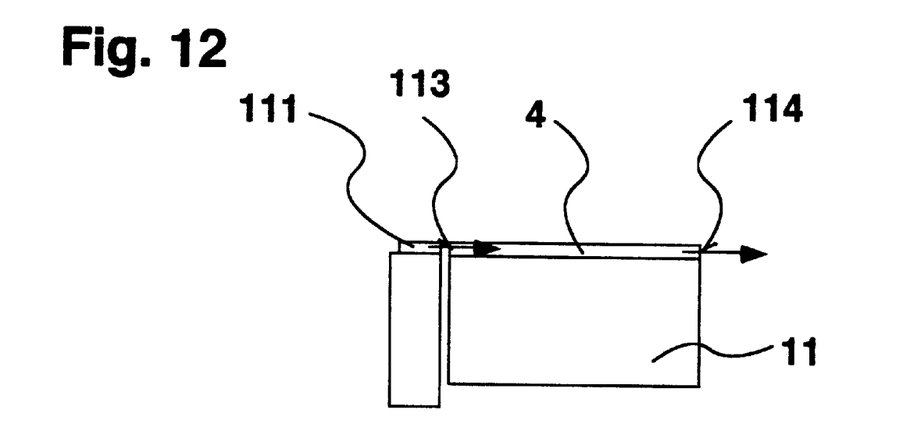

FIG. 11 and 12 show, how the combination of a diode laser 111 with a rib waveguide 4 results in a compact frequency-converted laser. To achieve this, the rib waveguide in accordance with the invention 4 is combined with a semiconductor diode laser in such a manner, that the light from the diode laser by means of an optical system, for example, one or several lenses 112 (FIG. 11) or also directly is coupled into the waveguide 4 and frequency-converted. It is also possible to utilize several primary light sources (in preference two). The first and/or second front side 113, 114 of the rib waveguide 4 can be provided with reflecting—or anti-reflex coatings. A reflecting coating on the second front side 114 makes it possible, that the rib waveguide 4 in a second pass can be utilized again for frequency conversion (also possible for the embodiments of FIGS. 13–14).

Figure 13:
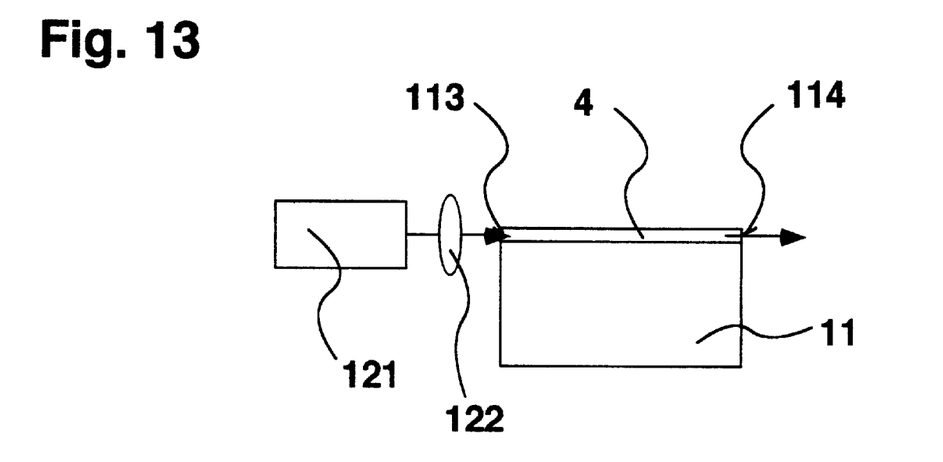

FIG. 13 illustrates how the combination of a solid-state laser 121 with a rib waveguide 4 results in a compact frequency-converted laser. To achieve this, the rib waveguide 4 is combined with a solid-state laser in such a manner, that the light from the solid-state laser 121 by means of an optical system, e.g., one or more suitable lenses 122, is coupled into the waveguide 4 and frequency-converted.

Figure 14:
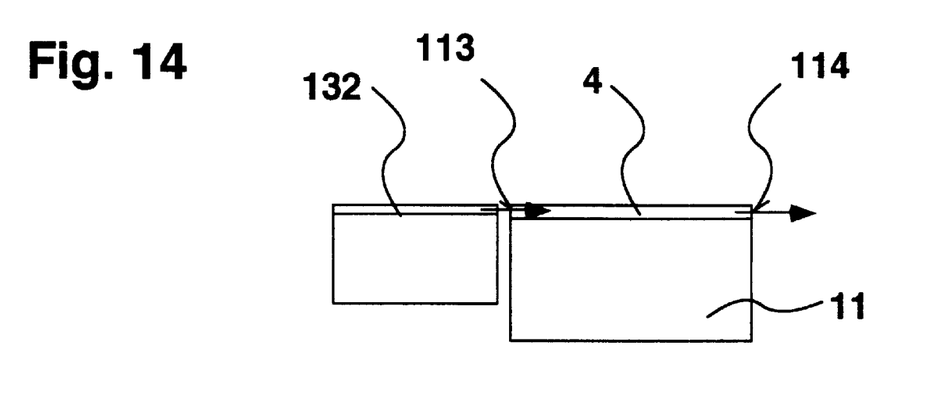

FIG. 14 illustrates how the combination of a waveguide laser 132 with a rib waveguide 4 results in a compact frequency-converter laser. To achieve this, the rib waveguide is combined with the waveguide laser 132 in such a manner, that the light from the waveguide 132 is directly coupled into the waveguide 4 and frequency-converted. Suitable as waveguide laser is also a fibre laser.

What is claimed is:

1. An apparatus comprising a waveguide, the waveguide manufactured from a non-linear optical crystal having a first surface, with a barrier layer in the crystal, the refractive index of which is lower than the refractive index of the crystal and which limits the waveguide in a direction vertical to the first surface, the material of the crystal being chemically unchanged in the barrier layer, but physically changed, inasmuch as the barrier layer contains ions and manifests deliberate radiation damage caused by the presence of the ions, as a result of which its refractive index is lower than that of the crystal, the waveguide further designed as a rib waveguide with a rib on the first surface, the walls of the rib limiting rib waveguide in a direction parallel to the first surface and the height of the rib above the first surface amounts to at least 0.5 micrometer.

2. The apparatus in accordance with claim 1, wherein the crystal is a ferro-electric oxide or a borate.

3. The apparatus in accordance with claim 1, wherein at least one dielectric covering layer, the refractive index of which is lower than the refractive index of the crystal, on the surface of the crystal.

4. The apparatus in accordance with claim 1, wherein the rib in the direction vertical to the crystal surface is split-up into two or more zones, which are separated by one or more barrier layers.

5. An apparatus comprising an optical frequency converter for frequency multiplication, sum frequency generation, difference frequency generation or opto-parametric oscillation or in electro-optical modulators, switches or directional couplers, wherein the optical frequency converter possesses a rib waveguide in accordance with claim 1.

6. An apparatus comprising a light source with at least one primary light source and at least one frequency converter, into which light emitted from the at least one primary light source can be coupled, wherein the at least one frequency converter is a rib waveguide in accordance with claim 1.

7. The light source in accordance with claim 6, wherein the at least one primary light source is a semiconductor diode laser, a solid-state laser, a waveguide laser or a fibre laser.

8. The light source in accordance with claim 6, wherein the light emitted by the at least one primary light source can be coupled into the at least one rib waveguide directly or through an optical system.

9. The light source in accordance with claim 6, wherein the at least one rib waveguide has a first and second front side and that at least one of these front sides is provided with a reflecting or anti-reflex coating.

10. A process for manufacturing a waveguide from a non-linear optical crystal, comprising:

(a) producing, as a first step, a barrier layer in the crystal, which in essence is parallel to a certain surface of the crystal, in that ions with a defined energy distribution and a defined dosage are implanted into the crystal through the certain surface, that the ions to be implanted, the distribution of the implantation and the implantation dosage are selected in such a manner, that the implanted ions do not form a chemical compound with the material of the crystal, do, however, physically change the crystal within a damage zone, inasmuch as the ions implant themselves in the damage zone and there deliberately cause permanent radiation damage, as a result of which the refractive index of the damage zone is permanently lowered relative to the crystal;

(b) applying a mask on the surface mentioned of the crystal; and (c) etching of the crystal from the surface mentioned, in order to form a rib on the surface mentioned, to such an extent, until the height of the rib above the surface mentioned amounts to at least 0.5 micrometers.

11. The process in accordance with claim 10, wherein for process step (a), the barrier layer is produced by the implantation of high-energy light ions into the crystal.

12. The process in accordance with claim 11, wherein for process step (a), He+ ions, He++ ions or H+ ions with an energy of 0.3 MeV to 3 MeV are utilized.

13. The process in accordance with claim 10, wherein following the process step (a) or (c), the crystal is baked at an increased temperature, in order to cure defects in a zone between the surface mentioned and the barrier layer.

14. The process in accordance with claim 10, wherein following the process step (a) or (c), an external electric field is applied to the crystal, in order to re-orientate ferro-electric domains and to pole the crystal along a designated direction.

15. The process in accordance with claim 10, wherein for process step (b), the mask on the surface mentioned is produced by a photo-lithographic process.

16. The process in accordance with claim 15, wherein for process step (b), the mask is hardened by means of ion implantation, chemically, by baking or by irradiation with ultraviolet radiation.

17. The process in accordance with claim 10, wherein for process step (b), the mask is separately pre-structured and placed on the surface mentioned.

18. The process in accordance with claim 10, wherein in a crystal several rib waveguides are simultaneously produced.

* * * * *